M. POETH.
CAR COUPLING ADJUSTER.
APPLICATION FILED JAN. 24, 1910.
1,091,956.
Patented Mar. 31, 1914.
2 SHEETS—SHEET 1.
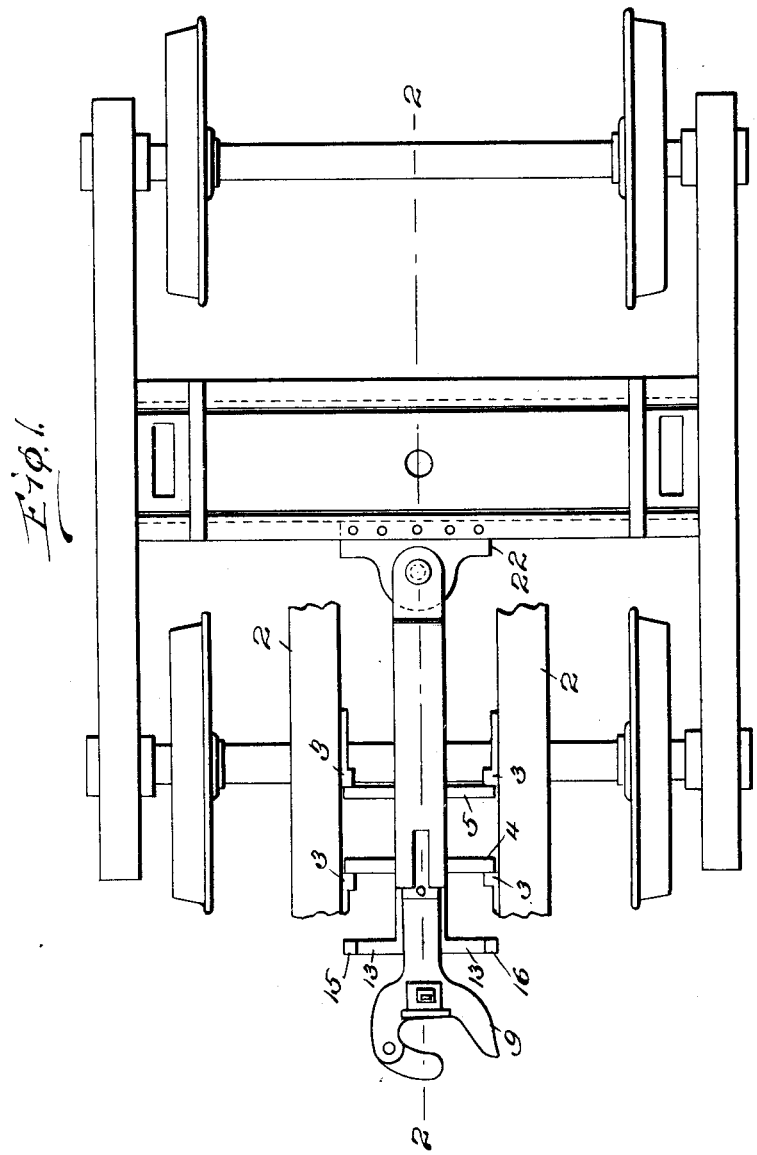

M. POETH.
CAR COUPLING ADJUSTER.
APPLICATION FILED JAN. 24, 1910.
1,091,956.
Patented Mar. 31, 1914.
2 SHEETS—SHEET 2.
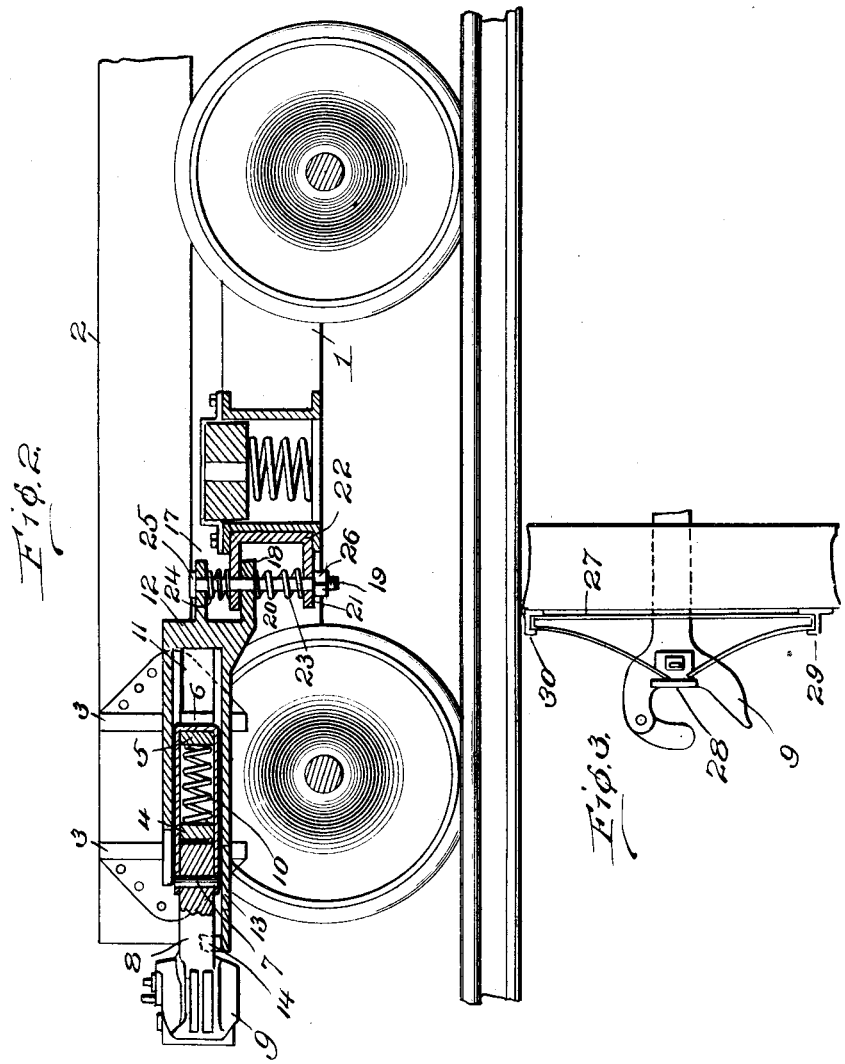

UNITED STATES PATENT OFFICE.

MAX POETH, OF DENVER, COLORADO, ASSIGNOR OF ONE-HALF TO FREDERICK BUTZ, OF DENVER, COLORADO.

CAR-COUPLING ADJUSTER.

1,091,956. Specification of Letters Patent. Patented Mar. 31, 1914.

Application filed January 24, 1910. Serial No. 539,826.

*To all whom it may concern:*

Be it known that I, MAX POETH, a citizen of the United States, residing at Denver, in the county of Denver and State of Colorado, have invented certain new and useful Improvements in Car-Coupler Adjusters; and I do hereby declare the following to be a full, clear, and exact description of the invention, such as will enable others skilled in the art to which it appertains to make and use the same.

This invention relates to improvements in means for maintaining car couplers at a predetermined height regardless of the load on the car.

The object in view is the arrangement of means for maintaining car couplers at the same height above the tracks regardless of whether or not the cars are loaded, and at the same time applying the strain to the car body.

A further object in view is the arrangement of a coupling mechanism which will permit a free swinging movement of the coupler between certain limits, and means for conveying power from the coupler to the car body regardless of the height or any up and down movement of the car body.

A still further object in view more specifically is the arrangement of a swinging draft rigging connected with a truck arranged to carry a coupler, and followers designed to engage brackets on the car body, the swinging coupler being yieldingly held in position at a predetermined height above the track, whereby power is conveyed to the body of the car.

With these and other objects in view the invention comprises certain novel constructions, combinations, and arrangement of parts as will be hereinafter more fully described and claimed.

In the accompanying drawings: Figure 1 is a top plan view of a truck with the present invention applied thereto, a fragmentary view of part of a car body being shown in connection therewith. Fig. 2 is a longitudinal vertical section through Fig. 1, approximately on line 2—2. Fig. 3 is a detail fragmentary view, looking from above, of an auxiliary spring and surrounding parts for assisting in holding the coupler away from the car body.

When applying couplers to car bodies as is usually practised they are, of course, higher when the car is empty than when the car is loaded, so that in making up a train of empty and loaded cars the couplers do not always properly engage each other, and the bumping and jolting of travel sometimes causes the disengagement of the coupler. In forming a device according to the present invention it is aimed generically to arrange means for maintaining an ordinary coupler at a predetermined height above the rails regardless of the loaded or unloaded condition of the cars. In forming a device of this character a draw bar is secured to a swinging support connected with the truck of a car pivotally, and is slidingly connected with the car body at the same time. By being pivotally connected with the truck, and not permitted a vertical movement the pivotal draft appliance holds the coupler at a fixed height above the rails, and the sliding connection between the coupler and the car body permits power to be communicated to the car body at all times.

In order that the invention may be more clearly understood an embodiment of the same is shown in the accompanying drawings, in which—

1 indicates a truck of any desired kind, and 2—2 the longitudinal booms or center sills of the car body. Secured to the center sills 2—2 are a plurality of brackets 3 which by their position form ways for followers 4 and 5. The various members 3 may be made any desired length so as to insure the followers 4 and 5 engaging the same, regardless of the height of the car body. The followers 4 and 5 are carried by a U-shaped member 6 which is pivotally secured at 7 to the shank 8 of coupler 9. A suitable spring 10 is interposed between followers 4 and 5 for giving a yielding action thereto as is usual. The U-shaped member 9 and the end of shank 8 are arranged in a bore 11 of a pivotally mounted member 12, and are supported thereby. Member 12 is formed with an extension 13 having arms 14 provided on the end thereof with projections 15 and 16 for limiting the swinging movement of the coupler 9. Member 12 is formed with projections or ears 17 and 18 which have apertures therein for accommodating bolt 19. Bolt 19 not only passes through the apertures in ears 17 and 18, but also through the ears 20 and 21 of the U-shaped member 22 secured to one of the channel irons of the truck. Interposed between ear 21 and ear 18 is a spring 23, and interposed between ear 17 and ear 20 is a spring 24. These respective springs are under some tension so as to always maintain the pivotally mounted member 12 in the highest position permitted by the bolt 19. Bolt 19 is provided with a head 25 at the upper end, and a nut 26 at the lower end.

If for any reason the coupler is too high above the track nut 26 is tightened for drawing downward bolt 19, and consequently for moving the coupler downward against the action of springs 23 and 24. Springs 23 and 24 yieldingly support member 12 at the highest point permitted by bolt 19 but will always permit a slight downward movement when the car runs over an obstacle, so as to take up the jolt and jar usual to cars. In arranging the pivotally mounted member 12 and member 22 the same are designed to be secured to the cross bars or members of any form of truck at a predetermined height, so that practically the only change necessary in the cars now in use would be the removal of the draw head and surrounding devices and the substitution of members 12 and 22 and associated parts, together with brackets 3. It will also be evident that if desired only new cars may be fitted with the device embodying the invention as the same may be freely used with cars having the old form of draft rigging and coupling devices.

In order to positively insure the coupler being in an outer position when not forced to an inner position, a spring 27 is provided for acting on the stop 28 secured by any desired means to the coupler. The spring 27 is positioned in ways 29 and 30 which are secured to the front of the car in any desired manner.

What I claim is:

1. In a device of the character described, the combination with a car provided with a car body and trucks, of stop lugs secured to said car body, a coupler formed with a shank, a support for said coupler pivotally connected with said truck, and followers connected with the shank of said coupler and slidingly engaging said stop lugs.

2. In a device of the character described, the combination with a car, of a draw bar, a casing connected with the truck of said car for supporting said draw bar, a plurality of springs for yieldingly supporting said casing, a stop for preventing said casing from rising above a predetermined height in relation to said truck, a pair of followers, means connecting said draw bar and said followers, and means secured to the body of said car and slidably engaging said followers for transmitting strain from said draw bar through said followers to said car body.

3. In a device of the character described, the combination with a car provided with a draw bar, of a support connected with the truck of said car for supporting said draw bar, a plurality of springs for yieldingly supporting said support, and a stop for preventing said support from rising above a predetermined height in relation to said truck.

4. In a device of the character described, the combination with a car body and truck therefor, of stop lugs rigidly connected with said car body, a coupler, a support for said coupler connected with and supported by said truck, whereby said coupler is supported by said truck, a substantially U-shaped member connected with the end of the shank of said coupler and projecting substantially in line therewith, a pair of followers extending through said U-shaped member and slidingly engaging said stop lugs, and a spring interposed between said followers.

5. In a device of the character described, the combination with a car provided with a draw bar, of a supporting casing for supporting said draw bar, a bracket secured to the truck of said car, a bolt passing through part of said casing and said bracket for connecting said casing to said truck, and a spring for resiliently maintaining said casing at a predetermined height in respect to said truck.

In testimony whereof I affix my signature in presence of two witnesses.

MAX POETH.

Witnesses:
CARLE WHITEHEAD,
ALBERT L. VOGL.